United States Patent

Ijzerman et al.

(10) Patent No.: US 8,047,696 B2
(45) Date of Patent: Nov. 1, 2011

(54) LUMINAIRE ARRANGEMENT WITH COVER LAYER

(75) Inventors: Willem Lubertus Ijzerman, Eindhoven (NL); Michel Cornelis Josephus Marie Vissenberg, Eindhoven (NL); Peter Hubertus Franciscus Deurenberg, 'S-Hertogenbosch (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 172 days.

(21) Appl. No.: 12/445,320

(22) PCT Filed: Oct. 11, 2007

(86) PCT No.: PCT/IB2007/054144
§ 371 (c)(1),
(2), (4) Date: Apr. 13, 2009

(87) PCT Pub. No.: WO2008/047274
PCT Pub. Date: Apr. 24, 2008

(65) Prior Publication Data
US 2010/0091488 A1   Apr. 15, 2010

(30) Foreign Application Priority Data

Oct. 16, 2006   (EP) .................................... 06122321
Oct. 30, 2006   (EP) .................................... 06123124

(51) Int. Cl.
*F21V 7/04*   (2006.01)
(52) U.S. Cl. .................. 362/609; 362/249.02; 362/607; 362/612

(58) Field of Classification Search .................. 362/601, 362/606, 607, 609, 612, 613
See application file for complete search history.

(56) References Cited

U.S. PATENT DOCUMENTS

| | | | |
|---|---|---|---|
| 5,944,405 A | 8/1999 | Takeuchi et al. | |
| 6,561,665 B1 * | 5/2003 | Kim | 362/604 |
| 6,745,506 B2 | 6/2004 | Maas et al. | |
| 6,814,456 B1 * | 11/2004 | Huang et al. | 362/30 |
| 2004/0240230 A1 | 12/2004 | Kitajima et al. | |
| 2005/0030727 A1 * | 2/2005 | Shimura | 362/26 |
| 2005/0129357 A1 | 6/2005 | Yang et al. | |
| 2005/0226004 A1 | 10/2005 | Koch et al. | |
| 2006/0187552 A1 | 8/2006 | Huang et al. | |

FOREIGN PATENT DOCUMENTS

| | | |
|---|---|---|
| WO | 2005078487 A1 | 8/2005 |
| WO | 2006003569 A1 | 1/2006 |

* cited by examiner

*Primary Examiner* — Ali Alavi (57) ABSTRACT

A luminaire arrangement for providing a luminous flux in a target direction (z) comprising a light guide (101), multiple light sources (103) arranged at said light guide for emitting light into said light guide, out coupling means (106) arranged at said light guide and adapted to direct light out from said light guide; and a cover layer (102) arranged in front of said light guide at the side where light it to be directed out, said cover layer being provided with at least one optically transparent area (104) such that light directed out from said light guide is allowed to pass said cover layer. The cover layer allows for use of the same or similar light guide, light sources and out coupling means in a number of different luminaire applications, where each application may have different requirements on e.g. appearance, and/or collimation and/or directivity of the luminous flux.

14 Claims, 6 Drawing Sheets

LUMINAIRE ARRANGEMENT WITH COVER LAYER

This application is a national stage application under 35 U.S.C. §371 of International Application No. PCT/IB2007/054144 filed on Oct. 11, 2007, which claims priority to European Application No. 06122321.0, filed on Oct. 16, 2006, and European Application No. 06123124.7 filed on Oct. 30, 2006, both incorporated herein by reference.

FIELD OF THE INVENTION

The present invention relates to a luminaire arrangement with multiple light sources for providing a luminous flux in a target direction.

BACKGROUND OF THE INVENTION

A recent trend in luminaires is to replace large conventional light sources, such as fluorescent tubes, with a plurality of smaller light sources, in combination providing the required coverage and/or luminance. Owing to previous and ongoing progress and development in the area of light emitting diodes (LEDs), LEDs are presently an advantageous choice of such a small light source, although other alternatives may be found in the future.

However, existing LED luminaries may suffer from a number of drawbacks.

For example, a requirement for a luminaire in general, including a LED based one, is that it should be able to provide a well controlled, well defined uniform luminous flux without unintentional spreading and/or obstruction of light. In particular, a luminaire should be able to comply with application specific requirements, for example regarding glare. In many applications, a glare related requirement is that the luminous flux should be uniform and not exhibit any bright spots, not even when the luminaire is viewed from certain oblique angles. This requirement, however, can be particular hard to meet when a plurality of small light sources are used, such as in LED based luminaries.

Another problem is heat dissipation, where temperatures at individual light sources often tend to be higher than what is desired.

Controlling and power supplying the plurality of light sources can also be hard to accomplish without negatively affecting the luminous flux.

Yet another problem is that that a luminaire should be able to present an appealing appearance. For example, it is often desirable that the luminaire should be able to present a discrete appearance that fits, or even is adapted to, the environment where the luminaire is used.

SUMMARY OF THE INVENTION

It is an object of the present invention to overcome or at least alleviate problems in the prior art and to provide an improved luminaire arrangement comprising a plurality of light sources, such as light emitting diodes (LEDs).

The invention is defined by the appended independent claims. Preferred embodiments are set forth in the dependent claims and in the following description and drawings.

Hence, according to a first aspect, the above-mentioned and other objects that will be evident from the following description, are achieved by a luminaire arrangement for providing a luminous flux in a target direction comprising a light guide, multiple light sources arranged at said light guide for emitting light into said light guide, out coupling means arranged at said light guide and adapted to direct light out from said light guide, and a cover layer arranged in front of said light guide at the side where light is to be directed out, said cover layer being provided with at least one optically transparent area such that light directed out from said light guide is allowed to pass said cover layer.

A luminous flux in a target direction here comprises a number of individual light rays, where each ray may deviate up to a certain angle, such as up to 90°, from the target direction. Smaller deviation means a luminous flux of greater collimation, where a fully collimated luminous flux thus would, at least in theory, correspond to 0° deviation.

Light sources and outcoupling means at the light guide typically means that these are arranged at least partly between major surfaces of the light guide, in the plane of the light guide or even in the light guide.

The cover layer allows for creating an adapted exterior appearance of a luminaire in the target direction, and may at the same time serve as protection of the light guide, both from physical damages but also from undesired optical contact caused by e.g. dust or other particles, and/or other objects in the environment where the luminaire is placed. Such undesired optical contact risk to impair the light guiding capabilities and result in out coupling of light at locations and in directions that are not desirable. The surface of the cover layer facing the target direction may e.g., without the risk of undesired optical contact, be provided with a texture that match the ambient environment where the luminaire is placed, e.g. a wallpaper.

Except from passing light from the out coupling means, the transparent areas also allow for post-adaptation, such as post collimation, of the light directed out from the light guide by the out coupling means, i.e. the cover layer also allow for adaptation of the luminous flux.

Hence, the cover layer allows for use of the same or similar light guide, light sources and out coupling means in a number of different luminaire applications, where each application may have different requirements on e.g. appearance, and/or collimation and/or directivity of the luminous flux. This is desirable over the more straightforward alternative of instead adapting the light guide for different applications, which is harder to accomplish without negatively affecting the light guiding and/or out coupling capabilities, and also tend to be more expensive.

Further, the cover layer except from the optically transparent area may be light obstructing. A light obstructing cover layer, e.g. accomplished by using a non-transparent and/or light absorbent material in the cover layer, allows for even better environmental adaptation since the risk of light being unintentionally coupled out at other locations than at and via the transparent apertures is reduced. When the cover layer covers the light source in the target direction direct light from these light sources in the target direction is prevented and thereby glare requirements more easily can be fulfilled. This is useful even when side-emitting LEDs are used for emitting light into the light guide since such LEDs in practice often emit small amounts of light also in other directions. For example, a side-emitting SMD LED typically emit about 10% of the light via "wrong" surfaces in undesired directions. Direct light from light sources may escape via the transparent areas, however, this can be remedied by arranging the cover layer in relation to the light guide and the light sources so that there is no light emitting part of any of the light sources visible via the transparent areas when the luminaire arrangement is viewed from any direction that deviates from the target direction by a predetermined angle, e.g. set by glare requirements.

The optically transparent area may comprise a transparent material. This allow for passage of light while it at the same time becomes more difficult for dust and other particles to enter. A transparent area that comprises a through hole in the cover layer that has been filled with the transparent material allows for a cover layer with an even surface, and thus a luminaire arrangement that is easy to maintain and keep clean, and where dust and particles can be prevented for entering via the cover layer and interfere with the light guide. Since the light sources (LEDs) and out coupling means are relatively small, even small, or small amounts of, particles that gather at the light guide and/or out coupling means may interfere and be problematic, and if such particles, e.g. dust, are allowed to accumulate, the problem worsens.

The transparent material may be provided with slits and/or indentations presenting a reflective surface for redirection of light from the out coupling means.

Slits and indentations allow for efficient and simple manufacturing, for example, air slits, or air indentations, can be made by laser cutting, or embossing, the transparent material. When the transparent material is provided as a layer, the slits and/or indentations can be provided at multiple transparent areas in the same manufacturing step.

Also, the transparent material may be formed as a lens for redirection of light from the out coupling means.

It should be noted that "redirection of light from out coupling means", here, in the foregoing and below, refers to redirection of incident light rays from the out coupling means, which e.g. allows for increased or decreased collimation and/or redirection of the luminous flux being provided by the out coupling means.

The optically transparent area may comprise an aperture, such as a through hole in the cover layer. It should be noted that a cover layer may comprise sublayers, and that the aperture in such cases may involve some, but not necessarily all, sublayers. An inner surface of the aperture may be reflective for redirection of light from the out coupling means.

The aperture may be funnel shaped with a larger opening in the target direction. The funnel shaped, or tapered, aperture has an inner surface with a slope that may be adapted to the degree of collimation of the luminous flux provided by the out coupling means so that the inner surface of the aperture is not illuminated. No, or less, illumination of the inner surface makes the surface less visible. The small inner opening also contributes to the less visibility, which in turn allows for a discrete luminaire. By providing the inner surface with a light absorbing material and/or a material that has the same appearance as the outer surface of the cover layer, the aperture can be made even less visible. Also, the funnel shape allow the cover layer not to unnecessarily obstruct light incident from the out coupling means.

In cases when it is not desired to affect collimation or directivity of the luminous flux being provided by the out coupling means, and/or when a particularly discrete luminaire is desired, the inner surface is typically non-reflective. However, a reflective inner surface of the funnel may be used to redirect incident light rays from the out coupling means, which e.g. allows for increased or decreased collimation and/or redirection of the luminous flux provided by the out coupling means. In such cases the slope of the funnel is, of course, adapted to its purpose accordingly.

The cover layer may have a thickness that is greater than the thickness of the light guide, preferably about 1.4 times greater or more. This is one way of preventing direct light from light sources in the luminous flux, which in turn makes it easier to fulfill glare requirements. Also, for example, when combined with a transparent area that comprises a funnel shaped aperture with a reflective inner surface having a linear slope, a thicker cover layer allows for post-collimation at small cut-off angles. A 1.4 times thicker cover layer may be e.g. used to reach a cut-off angle at 60°, i.e. to reach a luminous flux with light rays that do not diverge more than 60° from the target direction.

The light sources may be attached to the cover layer. The cover layer may thus act a substrate, and may for example be, or comprise, a printed circuit board PCB. Light sources attached to the cover layer allow for simple replacement of the light sources, for example in order to replace malfunctioning light sources or to adapt the light so as to be of a different color, be brighter etc.

The cover layer may comprises, or at least partly constitute, electrical conductors. The electrical conductors may be part of a PCB which the cover layer comprise, however, the conductors may also be separate from, or in addition to PCB conductor lines, for example be separate wires attached to the cover layer or be conductors arranged in a sublayer of the cover layer.

The cover layer may comprises, or at least partly constitute, a heat conducting layer. The heat conducting layer, for example a metal layer, is preferably in contact with the light sources, such as LEDs, or other heat generating components in the light guide where a spread of heat and reduction of local temperature is desired. A heat-conducting layer may also be used to conduct electricity.

The light sources are preferably light emitting diodes (LEDs).

The light guide layer may be a light guide plate.

There may be a plurality of LEDs accommodated in holes arranged in the plane of the light guide, wherein at least one hole has a first side facet for coupling light from any LED in the hole into the light guide and a second opposite side facet for coupling light out of the light guide, and wherein the holes are arranged such that all first side facets are facing one direction.

Preferably, the second out-coupling facets are reflective and tilted in relation to the plane of the light guide. The tilted reflective element may for example be a bare facet followed by an air slit and a reflector, all arranged at about 45 degrees in relation to the plane of the light guide, in which case light is coupled out of the light guide in a direction along the normal of the light guide plate.

Also preferably, the sidewalls of the holes between the first and second opposite facets are adapted to reflect any incoming light, for instance by means of total internal reflection (TIR).

Thus, the light from a given LED cannot penetrate another hole, since the first in-coupling facets are at the shadow side, the second out-coupling facets are reflective, and the remaining sides reflect all light by TIR. Hence, no light will be lost due to absorption or scattering at the other light sources of the luminaire arrangement, which ensures good light efficiency. Furthermore, the thickness of the light guide (and hence the luminaire arrangement) can be very small, preferably about 3 mm or less, mainly limited by the thickness of the LEDs themselves. Also, since only the LEDs and the second out-coupling facets have to be non-transparent, a significant area of the luminaire arrangement can be transparent, which makes it easier for the luminaire arrangement to harmonize with the surroundings when it is turned off. The transparent property may further be enhanced by placing the LEDs partly under the tilted reflective out-coupling facets.

Preferably, the holes are arranged in the plane of the light guide according to a staggered distribution. More preferably, the holes are arranged such that light in-coupled from a row of holes will not hit the second out-coupling facets of the next row of holes. This allows improvement of the light mixing properties of the luminaire arrangement. The light mixing in the light guide makes the luminaire arrangement robust for flux and color differences between the LEDs and also for failure of a few LEDs per m².

BRIEF DESCRIPTION OF THE DRAWINGS

This and other aspects of the present invention will now be described in more detail, with reference to the appended drawings showing a currently preferred embodiment of the invention.

FIG. 1b is a schematic top view of the luminaire arrangement of FIG. 1a.

FIG. 1c is a schematic side view of the luminaire arrangement of FIG. 1a.

FIG. 1d is a schematic top view at a transparent area in the cover layer of the luminaire arrangement of FIG. 1a.

FIG. 2b is a schematic top view at a transparent area in the cover layer of the luminaire arrangement of FIG. 2a.

FIG. 2c is a schematic top view of the luminaire arrangement of FIG. 2a.

FIG. 7b is a schematic bottom view of the cover layer of FIG. 7a.

DETAILED DESCRIPTION OF EMBODIMENTS

Figure 1A:
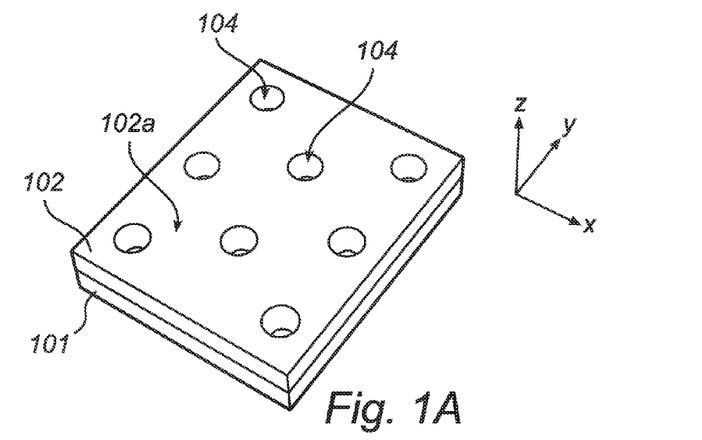
FIG. 1a is a schematic view in perspective of a luminaire arrangement with cover layer according to a first embodiment.
Figure 1B:
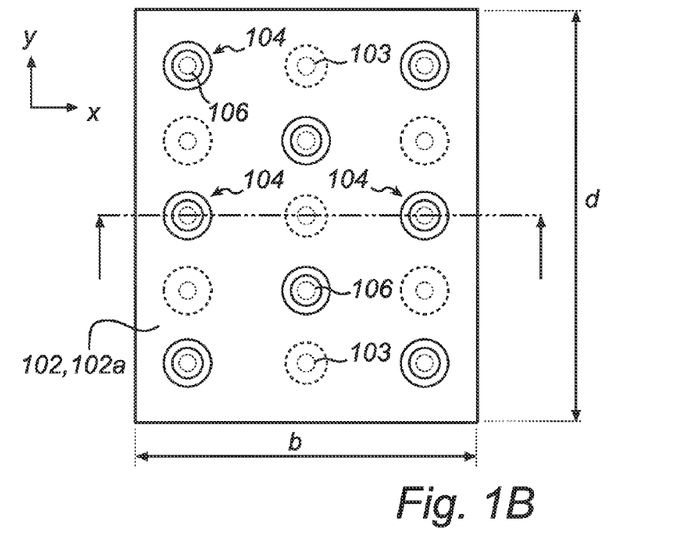

FIG. 1a is a schematic view in perspective of a luminaire arrangement with cover layer according to a first embodiment. A cover layer 102 is arranged in front of and attached to a light guide 101. FIG. 1b is a schematic top view of the luminaire arrangement of FIG. 1a, showing the surface 102a of the cover layer 102. Underlying out coupling means 106 and light sources 103 are outlined with dotted lines.

There are multiple light sources 103 arranged at the light guide for emitting light therein. The light is spread and mixed in the light guide and then directed out from the light guide in a target direction z by out coupling means 106 arranged at the light guide. The material of the light guide is typically PMMA or PC. The cover layer 102 is light obstructing but is provided with areas 104 that are transparent to the emitted light and arranged so that the light being directed out from the light guide via the outcoupling means pass via these areas. The cover layer has a major surface 102a that faces the target direction z and an opposite major surface that faces the light guide. To be light obstructing the cover layer may comprise or consist of a material that absorbs light emitted by the light sources. The cover layer is typically of plastic, but can be of almost any type of material, such as wood, metal etc.

Figure 1C:
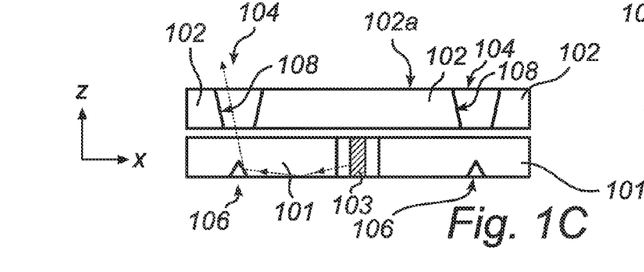
Figure 1D:
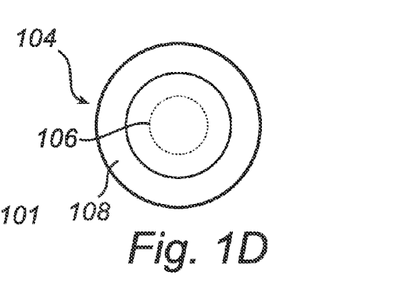

FIG. 1c is a schematic side view of the luminaire arrangement of FIG. 1a and is showing a cross section of the light guide 101 and the cover layer 102. An exemplary light ray-trace is shown by a dotted arrow. FIG. 1d is a schematic top view, from the target direction z, of a transparent area 104 in the cover layer 102 of the luminaire arrangement of FIG. 1a. The cover layer 102 is not in optical contact with the light guide 101 since such contact may impair the function and efficiency of the light guide and the luminaire. Optical contact can be avoided by even the slightest air gap between the cover layer and the light guide. Attaching the cover layer to the light guide by e.g. screws or clamps, preferably at the circumference of the arrangement, or attaching the cover layer, with or without optical contact, to the light guide at certain point locations where there is no light in the light guide, is typically sufficient to avoid detrimental optical contact between the cover layer and the light guide.

In FIG. 1b light sources are positioned symmetrically between the out coupling means 106. The transparent areas 104 of the cover layer are here circular and centered in front of the out coupling means. The cover layer has an area A and is here rectangular with sides of length d and d. The underlying light guide is substantially covered by the cover layer.

In FIG. 1c it can be seen that the transparent areas 104 comprise apertures in the form through holes in the cover layer 102. The apertures are funnel shaped with a larger opening in the target direction and have an inner surface 108. A light source 103 can be seen positioned in a through hole of the light guide. The light source is preferably a low power LED, such as below 100 mW, that is side emitting, i.e. a light source that mainly emits light in the plane of the light guide and not in the target direction z, which is perpendicular to said plane. The LEDs may e.g. be attached and electrically connected to a printed circuit board (PCB) (not shown) that is attached to the light guide (101) on the opposites side from where the cover layer (502) is attached. Of course also the PCB should be attached to the light guide without optical contact.

The out coupling means 106 are here tapered structures in the form of funnel shaped, conical recesses in the light guide and the transparent areas 104 in the cover layer are positioned opposite to the out coupling means in the light guide. The out coupling means present reflecting facets for light that is traveling in the light guide. In order to reflect light that travels parallel to the major surfaces of the light guide and direct such light out from one of the major surfaces in the target direction z, i.e. here towards the cover layer and the transparent areas, the facets are here arranged 45° in relation to the target direction.

In general, the area of a major surface of the luminaire arrangement, and the side lengths thereof, are typically large in comparison to the thickness, such as 10 times larger or more, i.e. the light guide and the cover layer are typically thin structures. For example, the thickness may be 1-100 mm, side lengths 0.1-5 m and the area 10 cm$^2$ to 10 m$^2$. In some application areas, the area of a major surface of the luminaire arrangement is a few hundred cm$^2$ up to some few m$^2$, but the thickness is only some few millimeters. For example, when LEDs are used as light sources, the thickness of the light guide may be 1.0-1.5 mm and there may be up to one light source every cm$^2$ of a major surface of the light guide The light sources are typically spaced apart from out coupling means by distances that is larger than the thickness of the light guide. For example, when the light guide is some few millimeters thick, the light sources is typically spaced apart from the out coupling means by some centimeters or more. Neighboring out coupling means are typically spaced apart by more than this distance and so are neighboring light sources. The density of outcoupling means in the light guide are preferably equal or larger than the density of light sources.

Figure 2A:
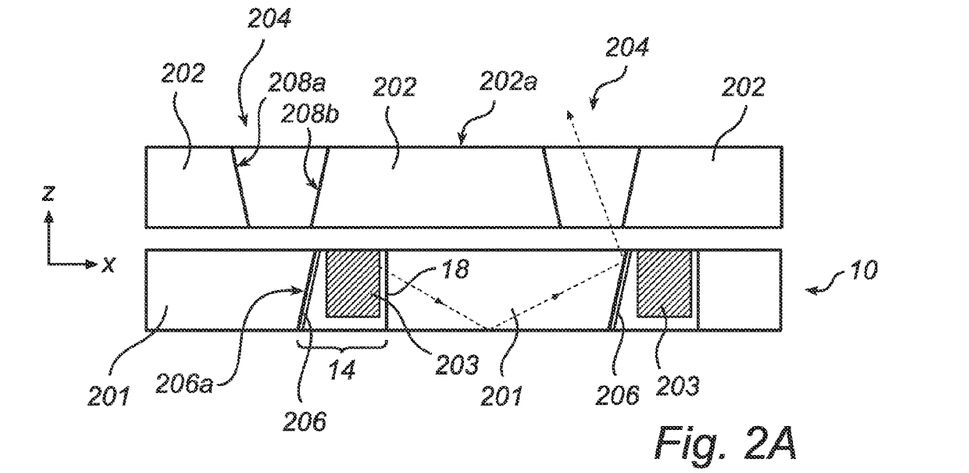
FIG. 2a is a schematic side view of a luminaire arrangement with a cover layer according to a second embodiment.

FIG. 2a is a schematic side view of a luminaire arrangement with a cover layer 202 according to a second embodiment and is showing a cross section of a light guide 201 and the cover layer 202. An exemplary light ray-trace is shown by a dotted arrow.

Figure 2B:
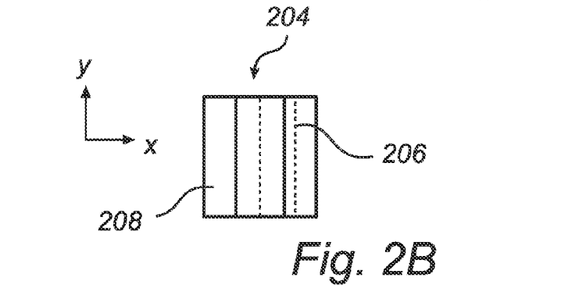
Figure 2C:
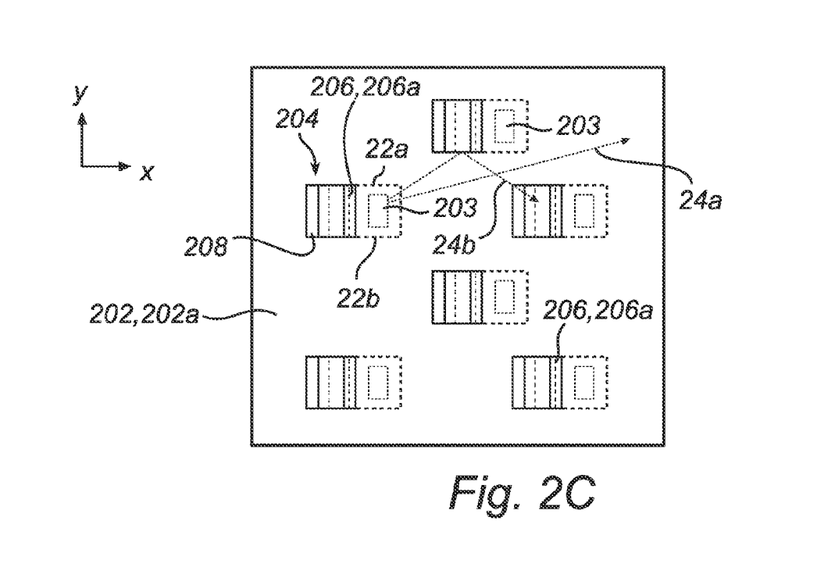

FIG. 2b is a schematic top view at a transparent area 204 in the cover layer 202 of the luminaire arrangement of FIG. 2a, and FIG. 2c is a top view of the luminaire arrangement of FIG. 2a. The transparent area 204 is here viewed from the target direction z and has a rectangular cross-section. The underlying out coupling means 206, in this embodiment a tilted mirror, is outlined with dotted lines.

Also in this embodiment a transparent area 204 of the cover layer comprises a funnel shape aperture. The aperture has two opposite inner surfaces 208a, 208b and is located so that light redirected by the out coupling means is allowed to pass through the aperture. Light in the light guide, which has been emitted by light sources 203, is reflected in a mirror facet surface 206a of the out coupling means 206 and is thereby directed towards the cover layer and the aperture 204. In the shown example each of the light sources are positioned closer to one out coupling means. However, the closest out coupling means to each light source shields that light source so that no light is directed towards an aperture via the closet out coupling means. The light sources are instead arranged to mainly emit light in a direction away from the closest out coupling means and towards more remote out coupling means, which via apertures 204 allow the light to be directed in the target direction z. Before being directed out by the remote out coupling means, the light may be mixed with light from other light sources.

A perspective view of the luminaire arrangement, i.e. corresponding to the views shown for the first embodiment in FIG. 1, have been excluded for the second embodiment. However, in view of the shown examples and the common features between these examples, it should be readily understood how a perspective view corresponding to FIG. 1a would look like for the second embodiment.

Further, the luminaire arrangement will now be described in relation to FIGS. 2a-2c. The luminaire arrangement denoted 10 comprises the transparent light guide plate 201. One side of the light guide 201 is provided with a plurality of holes 14, each accommodating a light emitting diode (LED) 203. The holes 14 can be a hole through the whole thickness of the light guide 201 or a hole at one side of the light guide 201. The LEDs 203 can be side emitting LEDs or top-emitting LEDs tilted about 90 degrees. Further, the LEDs 203 are preferably low power LEDs, in the order of 60 mW, for lowering the overall power consumption of the luminaire arrangement 10. Also, such LEDs do not generate very much heat, which may reduce the need for heat management means such as a heat sink. Also, such LEDs are usually smaller, which allows for a thinner luminaire arrangement 10.

In a typical implementation, the thickness of the light guide 201 is about 1.2 mm, the base area of the holes 14 is about 2.8-3.5×5.5 mm, and the LEDs 203 are about 0.8 mm in height and 2.8 mm in width. About one LED 203 is provided per cm$^2$ of the light guide 201. It should be noted that improvements in LED efficiency, and/or the use of higher-power LEDs, will allow for larger LED spacing, while keeping the light output of the luminaire arrangement the same.

Each hole 14 has a first in-coupling side facet 18, for coupling light from the LED 203 in the hole 14 into the light guide 201. At the opposite side of each hole 14, there is provided a second out-coupling side facet 206, for coupling light out of the light guide 201. Preferably, the out-coupling facet 206 is bare facet followed by an air slit and a mirror arranged at about 45 degrees in relation to the plane of the light guide plate 201, in which case light is coupled out of the light guide 201 in a direction along the normal of the light guide 201, i.e. here in the z-direction. A large part of the incoming light will be reflected by means of total internal reflection (TIR) at the bare facet without losses. The remaining light is reflected by the mirror behind the TIR facet to avoid light entering the next hole. The out-coupling facets 206 can out-couple the light to either side of the light guide 201, or both sides, depending on the application. The remaining side walls 22a, 22b of each hole 14 between the in-coupling facet 18 and the opposite out-coupling facet 206 are adapted to reflect any incoming light, for instance by means of TIR. TIR can be achieved by orientating the sidewalls 22 appropriately, parallel to the average direction of the light. The holes 14 are further arranged such that all in-coupling side facets 18 are facing one direction (the positive z-direction, or "upwards", in FIG. 1a). Consequently, all apposite out-coupling side facets 206 are facing the opposite direction (the negative z-direction, or "downwards", in FIG. 1a).

During operation of the luminaire arrangement 10, light emitted by one LED 203 is coupled into the light guide 201 via the in-coupling side facet 18 of the hole 14 where the one LED 203 is accommodated. The light is then coupled out of the light guide 201 via the out-coupling side facet 206 of some other hole 14, either directly (as indicated by exemplary ray-traces 24a) or after being reflected by the sidewall 22 of at least one other hole 14 (as indicated by exemplary ray-trace 24b).

Thus, the light from a given LED 203 will not penetrate another hole 14, since the in-coupling side facets 18 are at the shadow side, the out-coupling side facets 206 are reflective and the remaining sidewalls 22 reflect all light by TIR. Hence, no light will be lost due to absorption or scattering at the other light sources of the luminaire arrangement 10, which ensures good light efficiency. Furthermore, the thickness of the light guide 201 (and hence the luminaire arrangement 10) can be very small, mainly limited by the thickness of the LEDs 203 themselves.

The degree of light mixing in the luminaire arrangement 10 is controlled, among other things, by the distance between the holes 14, i.e. the hole density. As illustrated in FIG. 1a, light entering the light guide 201 at a given position can exit the light guide 201 at various out-coupling side facets 206. If there is a high hole density (i.e. short distances between the holes 14), most of the light from a given LED 203 will be out-coupled through the out-coupling side facet 206 (of another hole 14) opposite the in-coupling side facet 18 of the given LED 203. On the other hand, if the hole density is low (i.e. long distances between the holes 14), the light from a given LED 203 will spread out to many out-coupling side facets 206 and the light from many LEDs 203 will be mixed before it leaves the light guide 201.

Further, the light mixing properties can be improved by arranging the holes 14 according to a staggered distribution, as illustrated in FIG. 1a. The light exiting may have a limited angle of departure range, whereby the light will not hit the most adjacent row of out-coupling side facets 206 if these are outside the range. Instead, the light is forced to travel further in the light guide 201 before it is coupled out, resulting in more mixing in the plane of the light guide 201. For example, if the angle of departure range is about 80 degrees centered, any out-coupling side facet 206 at 45 degrees (as in the staggered distribution in FIG. 1a) will be "invisible". The angle of departure range is for example determined by the refractive index of the material of the light guide 201, by the emission pattern of the LED, and/or by a collimator in the hole (if present).

Note that not every hole have to contain an LED, some holes may for example only be used for out-coupling of light. Also, the LED luminaire arrangement is suitably and advantageously a cut to measure luminaire arrangement, so that a luminaire arrangement having a desired shape and size can be cut out of a larger luminaire arrangement. In such a cut to measure device, the LEDs are preferably connected in parallel.

Figure 3:
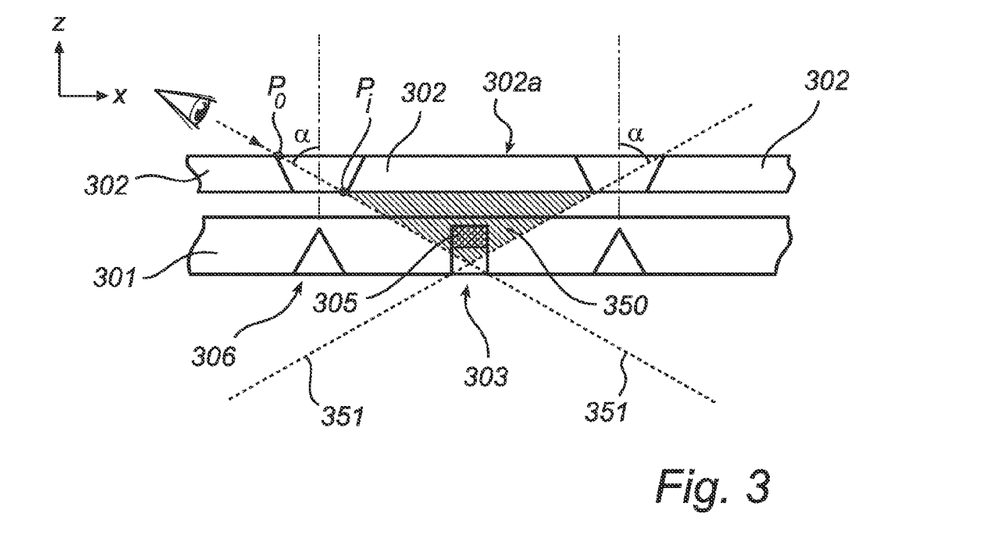
FIG. 3 is a schematic side view of a luminaire arrangement with cover layer for illustrating placement of light sources to avoid direct light from these via transparent areas in the cover layer.

FIG. 3 is a schematic side view of a luminaire arrangement with cover layer for illustrating how a cover layer 304 may prevent direct light from light sources via transparent areas 304 in the cover layer 302. Light guide 301, light sources 303, out coupling means 306 and cover layer 302 are similar to what has been described in connection with FIG. 1. When the cover layer is light obstructing and side emitting light sources are used, such as LEDs of side emitting type, light that still is emitted directly in the target direction, e.g. via a top surface of an imperfect side-emitting LED, is avoided when the cover layer covers the light sources in the target direction as in the shown example. However, there is still a risk that the light sources 303 emit light that is also directed towards, and let out via, the transparent areas 304. This may occur when light is emitted by a light source in directions between the target direction z and plane xy of the light guide. When this light deviate from the target direction z less than a certain angle set by the glare requirements, such as 60°, these requirements may be hard to fulfill. However, this kind of oblique direct light can be avoided by arranging the cover layer and the transparent areas so that no light emitting part 305 of the light sources 303 are visible via the transparent areas 304, here the apertures, when the luminaries is viewed from the target direction side of the cover layer, at angles that are within the angular limit set by the glare requirements.

In FIG. 3a, a dashed line 351 marks the line of sight through an aperture 304 at a deviation angle α, here the largest possible. The largest possible α-angle occurs when the sight line is tangent to the opening of the aperture facing the light guide, here point $P_i$, and at the same time is tangent to the opening of the aperture in the target direction, here a point $P_o$, that is as remote from point $P_i$ as possible.

When corresponding lines are drawn through all apertures, a virtual area 350 is formed between these lines at the light guide side of the cover layer. The area represents locations where there is no direct path from the target direction side via the apertures to the opposite side of the cover layer.

It should be readily understood that the area 350 corresponds to a volume in a three-dimensional (3d) case, and that the area 350 is used merely for illustrating the general principle.

By arranging the cover layer 302 and apertures 304 so that light emitting parts of light sources are placed inside the area 350, direct light from the light sources in the luminous flux is avoided. The area 350 (or corresponding volume in a 3d-case) increase, i.e. there will be more locations for a light emitting part of a light source to be placed, when the thickness of the cover layer increase and/or when the openings of the apertures (transparent areas) decrease and/or when the distance between neighboring apertures (transparent areas) increase.

It should further be understood that an alternative area corresponding to the area 350 can be formed by keeping the angle α in relation to the target direction constant while keeping the dashed line a tangent to point $P_i$ only. If the angle α in this case is an angle set by glare requirements, these requirements can be met by arranging the cover layer so that light emitting parts of light sources are located within this alternative area, although, in this case, there may be angles larger than α where direct light may occur.

Figure 4:
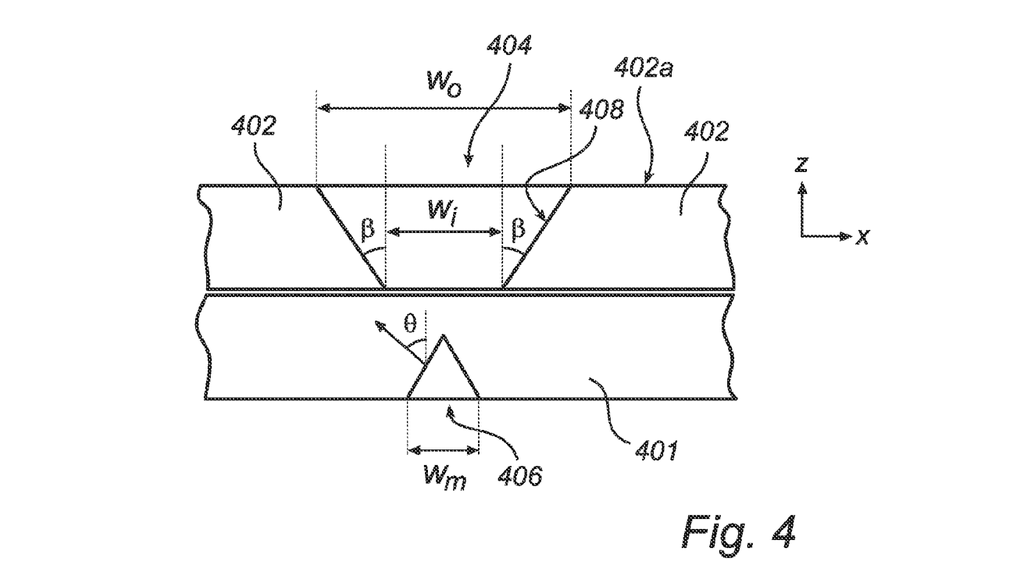
FIG. 4 is a schematic side view of a luminaire arrangement with cover layer according to a third embodiment where transparent areas in a cover layer are adapted to the degree of collimation of light incident from the light guide.

FIG. 4 is a schematic side view of a luminaire arrangement with a cover layer according to a third embodiment where a transparent area 404 in a cover layer 402 is adapted to the degree of collimation (alternatively non-collimation) of light from the light guide 401. In this example light in a luminous flux being provided and directed in a target direction z by out coupling means 406 do not deviate more than a angle θ from the target direction, or at least a major part of the light in the luminous flux deviate less than this angle. The angle θ can thus be seen as a collimation angle representing the degree of collimation of the luminous flux. When the light in a flat light guide is not collimated, light guiding conditions (total internal reflection, TIR) specify that any beam angle inside the light guide should be within 45° with respect to the plane (xy) of the light guide. When this is the case and the out coupling means comprise a reflective surface, such as a mirror-like surface, tilted about 45° with respect to the plane, it may be noted that also θ is about 45°. It may however be noted that the tilt angle is dependent on the refraction index, for example, in a light guide material with n=1.5 the cone providing the reflective surface typically is +/−42°.

The transparent area 404 here comprises a funnel shaped aperture with a linear slope having a slope angle β in relation to the target direction z. The aperture has an inner surface 408. The aperture has a wider opening $w_o$ in the target direction and a smaller opening $w_i$ facing the light guide. The slope angle β is here at least the collimation angle θ. This way no, or at last a reduced amount of light inside on the inner surface 408. The inner width $w_i$ is selected so that all, or at least a major part of the light being directed in the target direction by the out coupling means 406 is received by the aperture 404. It is readily understood that to achieve this, the inner opening has to be wider, i.e. $w_i$ larger, the farther the light being reflected by the out coupling means has to travel before the inner opening of the aperture is reached. Hence, in order to keep the apertures small and thus less visible, the cover layer should be arranged as close to the light guide and the out coupling means as possible without optical contact. In the present embodiment the inner width $w_i$ of the aperture is larger than a width $w_m$ of the out coupling means.

In another embodiment the inner opening is less wide and thus some of the light from the out coupling means is incident on the inner surface 402b of the cover layer and is thereby excluded from the luminous flux produced by the luminaire arrangement. Although this decrease efficiency, this may in some application still be desirable, for example when small apertures are desired in order to create a less visible luminaire or when less illumination cannot be achieved by other means.

In order to make the apertures 404 even less visible, the inner surface 408 of the apertures may present a similar appearance as the outer surface 402a of the cover layer. For example, when the outer surface of the cover layer is provided with a texture, e.g. to create an appealing or discrete appearance, the inner surfaces of the aperture may be provided with a similar texture.

In another embodiment there is light incident on an inner surface of the aperture which surface has been provided with a light-absorbing layer so that the incident light is not reflected. This way low visibility of the apertures can be accomplished although the slope angle β is less than the collimation angle θ, but to the price of some light being lost when passing the apertures.

Figure 5:
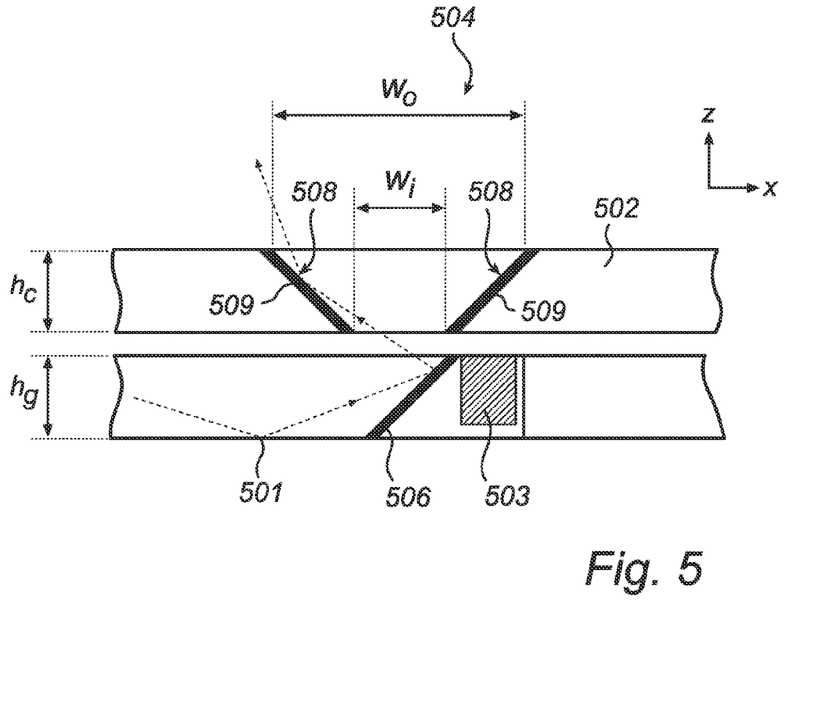
FIG. 5 is a schematic side view of a luminaire arrangement with cover layer according to a fourth embodiment where transparent areas in a cover layer comprise reflective surfaces.

FIG. 5 is a schematic side view of a luminaire arrangement with cover layer according to a fourth embodiment, where a transparent area 504 in a cover layer 502 is in the form of a funnel shaped aperture. The funnel shaped aperture has reflective inner surfaces 508. The reflective inner surfaces here have been formed by providing inner surfaces of a funnel shaped aperture in the cover layer with a highly reflective material, such as a mirror-like material. The reflective inner surfaces 508 are arranged for post-collimation of the luminous flux that is provided by out coupling means 506. Similar to the embodiment of FIG. 4 an inner opening of the aperture is formed so that all, or at least a major part, of the light being directed in the target direction by the out coupling means is received by the aperture. It may be noted that except from the inner surfaces provided with the mirror-like material, the luminaire arrangement of FIG. 5 is similar to the arrangement of FIGS. 2a-2c.

Light is directed out from the light guide 501 towards the cover layer aperture 504 by outcoupling means 506, here a mirror, that is arranged at 45° and extends between the major surfaces of the light guide. The light guide has a thickness $h_g$ and the thickness of the cover plate is $h_c$. The funnel shaped aperture has an entrance width $w_i$ and exit width $w_o$. An exemplary light ray-trace is shown by a dotted arrow in FIG. 5.

The direct ray, i.e. the ray that can pass the aperture direct without reflection, that has the largest angle with respect to the target direction (z) has an angle of a $\tan((w_o+w_i)/(2 h_c))$ degrees. The indirect ray, i.e. the ray that can pass the aperture with reflection, has a maximum angle of 90−2 a $\tan((w_o-w_i)/(2 h_c))$ degrees. For an efficient collimator design, these so-called cut-off angles should typically be about the same, which results in:

$$w_o = \frac{1}{3}w_i + \sqrt{\left(\frac{2}{3}w_i\right)^2 + \frac{4}{3}h_c^2} \quad \text{(Eq. 1)}$$

When the light in the light guide is not collimated, light guiding conditions (TIR) specify that the beam angle inside the light guide should be within about 45 degrees with respect to the plane (xy) of the guide. This means here that, roughly, the funnel entrance $w_i$ should be, at least, $2 h_g$ in order to catch all out-coupled light.

By combining $w_i=2 h_g$ with equation Eq. 1 and using one of the cut-off angle equations, the result is:

$$\alpha = \arctan\left[\frac{4h_g}{3h_c} + \sqrt{\left(\frac{2h_g}{3h_c}\right)^2 + \frac{1}{3}}\right] \quad \text{(Eq. 2)}$$

This equation shows that, for example, when the light guide and the cover layer have the same thickness, i.e. hc=hg, a cut-off angle of 66° can be obtained by means of the post-collimation only, i.e. by the aperture with the reflective inner surfaces. In order to obtain a cut-off angle of 60° degrees (which is a typical glare requirement for office lighting applications), the cover layer should be about 1.4 times the thickness of the light guide.

A post-collimator of this kind may thus provide a sufficient degree of collimation, at least in one direction, when the cover layer is sufficiently thick, such as 1.4 times the thickness of the light guide or more.

Note that the cover layer in other embodiments may be thinner than the light guide, e.g. when the cover layer is not used for post-collimation.

In another embodiment the aperture is filled with a transparent material and in yet another embodiment the aperture has no inner reflective surfaces and instead post-collimation is achieved by a transparent material in the aperture that is formed as a lens.

Figure 6:
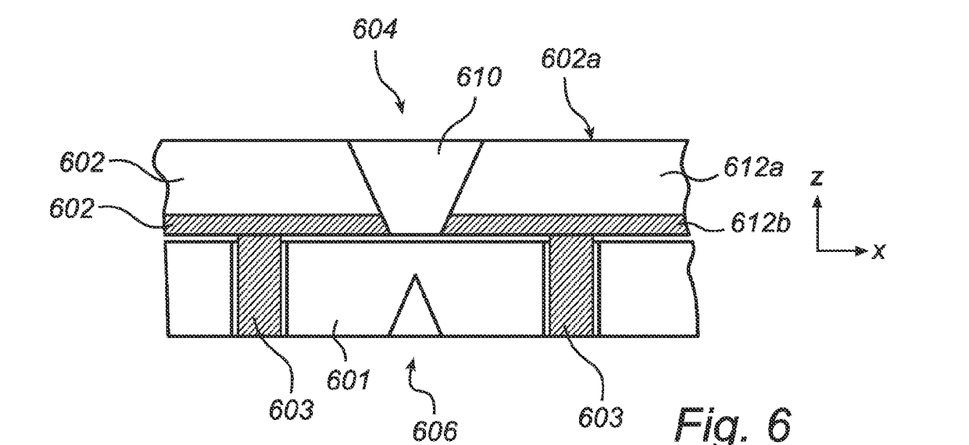
FIG. 6 is a schematic side view of a luminaire arrangement with cover layer according to a fifth embodiment where the cover layer comprises a heat conducting sublayer at the light guide.

FIG. 6 is a schematic side view of a luminaire arrangement with cover layer according to a fifth embodiment where a cover layer 602 comprises a heat conducting sub layer 612b facing the light guide 601. The cover layer also comprises an upper sublayer 612a facing the target direction. The heat conducting layer 612b is in contact with the light sources 603 which are positioned in through holes in the light guide. A transparent area 604 is here a funnel shaped aperture extending through both sublayers 612a, b and which aperture is filled with an optically transparent material 610.

In an alternative embodiment the cover layer consists of a single layer heat conducting material.

Figure 7A:
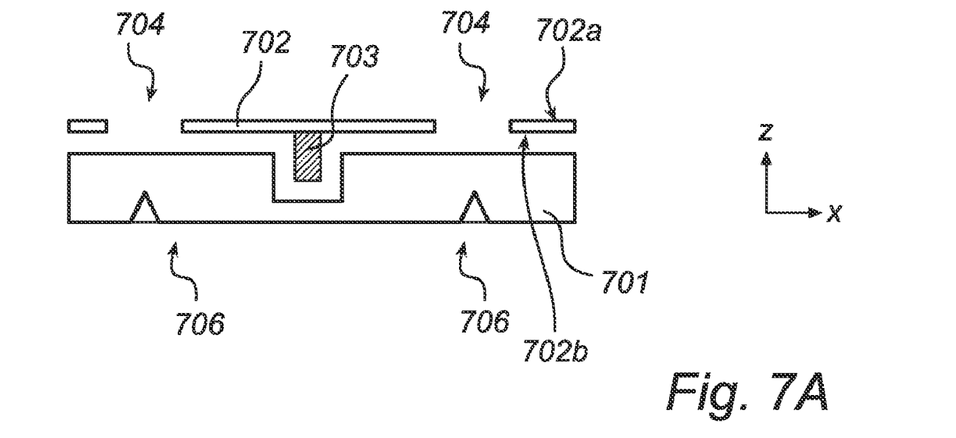
FIG. 7a is a schematic side view of a luminaire arrangement with cover layer according to a sixth embodiment where a light source is attached to the cover layer.

FIG. 7a is a schematic side view of a luminaire arrangement with cover layer according to a sixth embodiment where a LED light source 703 is attached to a cover layer 702. The cover layer is thus used as substrate for the light source. When the cover layer is attached to a light guide 701, the light source is positioned in a recess in the light guide. Similar to the previous embodiments, the light source 703 emit light into the light guide 701 which light is then directed in a target direction z by out coupling means 706 via apertures 704 in the cover layer. The apertures are positioned in front of the out coupling means in the target direction.

Figure 7B:
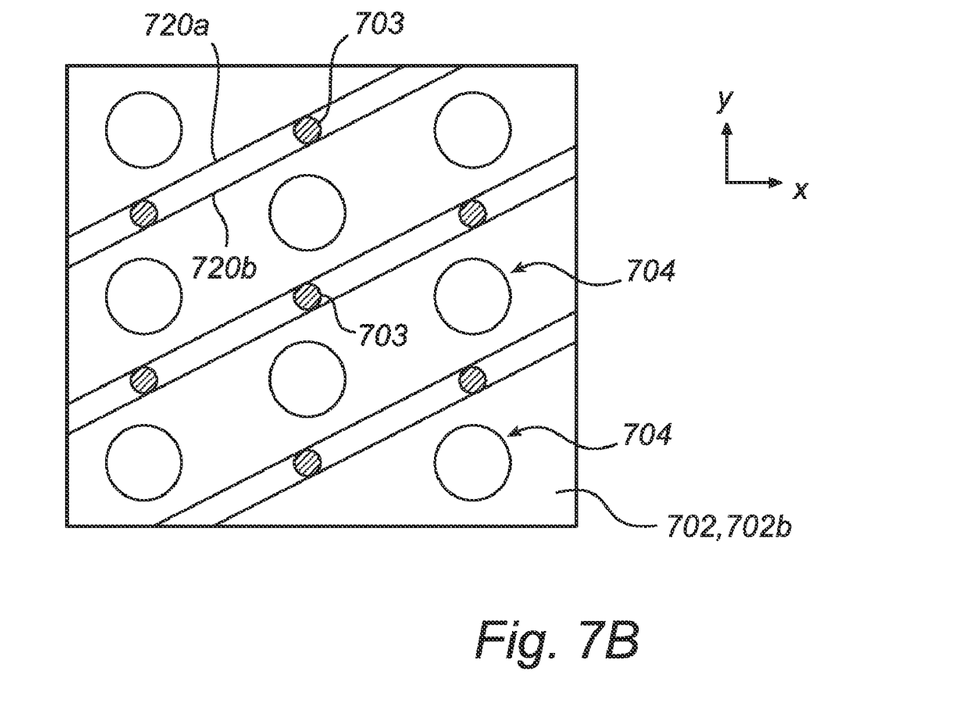

FIG. 7b is schematic bottom view of the cover layer of FIG. 7a. The cover layer is provided with conductor lines for power supply and/or control of light sources 703 attached to the cover layer. The conductors are printed on the inner surface of the cover layer, and the cover layer may thus be considered to at least partly consist of a printed circuit board (PCB).

In another embodiment the conductors are wires attached to the cover layer and in yet another embodiment the light source is provided with electrical connections via the light guide and the light sources are electrically connected when placed in the light guide recesses.

Figure 8:
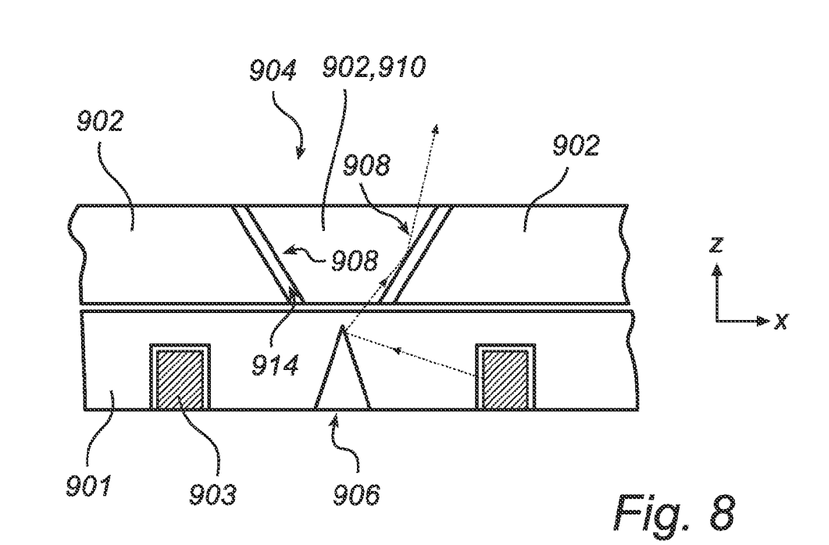
FIG. 8 is a schematic side view of a luminaire arrangement with cover layer according to a seventh embodiment where the cover layer is transparent and provided with reflective slits.

FIG. 8 is a schematic side view of a luminaire arrangement with cover layer according to an seventh embodiment. The light guide 901, light sources 903 and out coupling means 906 are similar as in previous embodiments. Here, however, the cover layer 902 is of an optically transparent material and optically transparent areas 904 comprise air slits 914 in the cover layer. The cover layer is here of the same material as the light guide, but may in other embodiments be of a different material. When a slits 914 is made in the transparent cover layer material there is formed a reflective surface 908. Slits are here made so that the resulting reflective surfaces, in a similar way as was described in connection with FIG. 5, post-collimate light that is directed towards the cover layer 902 by the out coupling means 906. The transparent area 904 comprises a portion 910 of the of the cover layer formed between slits 914. Light from the out coupling means pass this portion of the cover layer.

Figure 9:
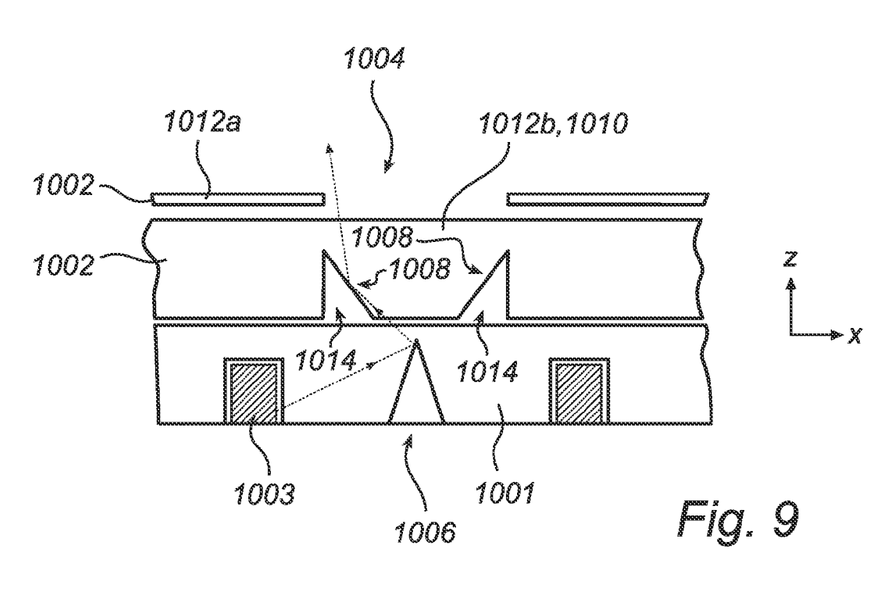
FIG. 9 is a schematic side view of a luminaire arrangement with cover layer according to an eight embodiment where the cover layer comprises a transparent sublayer provided with indentations and a light obstructing sublayer with an aperture.

FIG. 9 is a schematic side view of a luminaire arrangement with cover layer according to an eight embodiment where a cover layer 1002 comprises a transparent sublayer 1012b provided with indentations 1014. Light guide 1001, light sources 1003 and out coupling means 1006 are similar as in the seventh embodiment, here, however, a transparent area 1004 in the cover layer comprise air indentations 1014 in the transparent sublayer 1012b instead of slits. The indentations 1014 may e.g. be made by embossing. When an indentation 1014 is made in the transparent cover layer material there is formed a reflective surfaces 1008. The indentations 1004 are, similar to the slits in the previous embodiment, made so that the resulting reflective surface 1008 post-collimate light that is directed towards the cover layer 1002 by the out coupling means 1006. Instead of only one transparent cover layer, the cover layer 1002 here also comprises an additional, outer non-transparent sublayer 1012a that covers the transparent sublayer 1012b except for at the transparent areas 1004. The non-transparent cover layer 1012a has apertures at the transparent areas 1004.

It may be noted that a perspective view and top view of the luminaire arrangement, i.e. corresponding to the views shown for the first embodiment, have been excluded for the third to eight embodiment. However, perspective and top views similar to FIG. 1a-1b are applicable also for the third to eighth embodiment. Alternatively, transparent areas in cover layers and/or out coupling means at the light guides may have rectangular shapes similar to FIG. 2b.

Applications for the luminaire arrangement according to the present invention include indoor lighting such as office lighting or atmospheric or decorative lighting, outdoor lighting such as illumination of buildings, signs, etc.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment where a lens or reflective inner surface of an aperture in the cover layer are arranged for other types of post adaptation than post-collimation, e.g. for redirection of the luminous flux so that the target direction changes, or for spreading the light and make the luminous flux less collimated, where post-collimation in the cover layer is combined with collimation being provided in the light guide and/or directly at the light sources, where collimation is only taking place in the light guide and/or directly at the light sources, where the apertures have parallel inner surfaces or where a funnel shaped aperture do not have linear inner surface slopes but instead inner surfaces with a curvature, where the cover layer is rigid, semi-rigid or flexible, where the luminaire arrangement, including the cover layer, has other shapes than what here has been shown, e.g. where the luminaire arrangement instead of being sheet shaped is wholly or partly curved, e.g. concave or convex, and/or has a varying thickness, where a light guide emit light through more than one surface and there is more than one target direction, where there are cover layers at more than one side of a light guide, where out coupling means and/or light sources are placed at other locations at the light guide, where the out coupling means have other shapes and/or sizes, present more or less facets, present facets at different angles, where out coupling means reflect light out from the light guide in different directions, where out coupling means direct light out through two or more major surfaces of a light guide, where out coupling means comprise a reflecting part and/or material that is not part of the light guide per se, with or without involving recesses in the light guide, etc. Also, the luminaire arrangement according to the invention is suitably and advantageously a cut to measure luminaire arrangement, so that a luminaire arrangement having a desired shape and size can be cut out of a larger luminaire arrangement. In such a cut to measure device, the light sources are preferably connected in parallel.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A luminaire arrangement for providing a luminous flux in a target direction (z) comprising:
   a light guide;
   multiple light sources configured and disposed for emitting light into said light guide;
   out coupling means configured and disposed for directing the light out from said light guide; and
   a cover layer comprising at least one optically transparent area and disposed proximate to said outcoupling means, such that the light directed out from said light guide passes through said cover layer, wherein the light sources are attached to the cover layer.

2. The luminaire arrangement as claimed in claim 1, wherein the cover layer further comprises light obstructing area.

3. The luminaire arrangement as claimed in claim 1, wherein the at least one optically transparent area comprises a transparent material.

4. The luminaire arrangement as claimed in claim 3, wherein the transparent material defines a plurality of slits forming a reflective surface for redirection of light from the out coupling means.

5. The luminaire arrangement as claimed in claim 3, wherein the transparent material defines a plurality of indentations forming a reflective surface for redirection of light from the out coupling means.

6. The luminaire arrangement as claimed in claim 3, wherein the transparent material is formed as a lens for redirection of light from the out coupling means.

7. The luminaire arrangement as claimed in claim 1, wherein the at least one optically transparent area defines an aperture.

8. The luminaire arrangement as claimed in claim 7, wherein an inner surface of the aperture is reflective for redirection of light from the out coupling means.

9. The luminaire arrangement as claimed in claim 7, wherein the aperture is funnel shaped with a larger opening in the target direction.

10. The luminaire arrangement as claimed in claim 1, wherein the cover layer has a thickness (hc) that is at least about 1.4 times greater than the thickness of the light guide (hg).

11. The luminaire arrangement as claimed in claim 1, wherein the light sources are light emitting diodes LEDs.

12. The luminaire arrangement as claimed in claim 1, wherein the cover layer is electrically and/or thermally conductive.

13. A luminaire arrangement for providing a luminous flux in a target direction (z) comprising:
    a light guide;
    multiple light sources configured and disposed for emitting light into said light guide;
    out coupling means configured and disposed for directing the light out from said light guide; and
    a cover layer comprising at least one optically transparent area and disposed proximate to said outcoupling means, such that the light directed out from said light guide passes through said cover layer, wherein the at least one optically transparent area comprises a transparent material, and wherein the transparent material is formed as a lens for redirection of light from the out coupling means.

14. A luminaire arrangement for providing a luminous flux in a target direction (z) comprising:
    a light guide;
    multiple light sources configured and disposed for emitting light into said light guide;
    out coupling means configured and disposed for directing the light out from said light guide; and
    a cover layer comprising at least one optically transparent area and disposed proximate to said outcoupling means, such that the light directed out from said light guide passes through said cover layer, wherein the at least one optically transparent area defines an aperture.

* * * * *